US005666330A

United States Patent [19]
Zampetti

[11] Patent Number: 5,666,330
[45] Date of Patent: Sep. 9, 1997

[54] DISCIPLINED TIME SCALE GENERATOR FOR PRIMARY REFERENCE CLOCKS

[75] Inventor: George Philip Zampetti, Livermore, Calif.

[73] Assignee: Telecom Solutions, Inc., San Jose, Calif.

[21] Appl. No.: 278,423

[22] Filed: Jul. 21, 1994

[51] Int. Cl.$^6$ ................................................. G04C 11/02
[52] U.S. Cl. ............................................................ 368/47
[58] Field of Search ........................................... 368/47–57

[56] References Cited

U.S. PATENT DOCUMENTS

| | | |
|---|---|---|
| 3,585,306 | 6/1971 | Battochetti . |
| 3,936,604 | 2/1976 | Pommerening . |
| 4,076,964 | 2/1978 | Henrion et al. . |
| 4,086,437 | 4/1978 | Henrion et al. . |
| 4,464,748 | 8/1984 | Krikor . |
| 4,998,231 | 3/1991 | Watanabe et al. . |
| 5,045,763 | 9/1991 | Kobayashi et al. . |
| 5,128,909 | 7/1992 | Stein ........................................ 368/200 |
| 5,155,695 | 10/1992 | Stein ........................................ 368/46 |
| 5,202,762 | 4/1993 | Fellinger . |
| 5,218,717 | 6/1993 | Reitberger . |
| 5,226,019 | 7/1993 | Bahorich . |
| 5,268,844 | 12/1993 | Carver et al. . |
| 5,289,508 | 2/1994 | Wada et al. . |
| 5,315,566 | 5/1994 | Stein ........................................ 368/46 |
| 5,319,680 | 6/1994 | Port et al. . |
| 5,333,150 | 7/1994 | Ketterling . |
| 5,334,984 | 8/1994 | Akaba . |
| 5,341,462 | 8/1994 | Obata . |
| 5,366,862 | 11/1994 | Venton et al. . |
| 5,394,852 | 3/1995 | McAlister . |
| 5,398,040 | 3/1995 | Ogino et al. . |
| 5,399,995 | 3/1995 | Kardontchik et al. . |
| 5,406,523 | 4/1995 | Foss et al. . |
| 5,406,591 | 4/1995 | Watanabe . |
| 5,424,885 | 6/1995 | McKenzie et al. . |
| 5,430,771 | 7/1995 | Fix et al. . |
| 5,430,773 | 7/1995 | Marbot . |
| 5,432,837 | 7/1995 | Engelke et al. . |
| 5,440,631 | 8/1995 | Akiyama et al. . |
| 5,442,169 | 8/1995 | Kunz . |
| 5,458,140 | 10/1995 | Eppstein et al. . |
| 5,461,426 | 10/1995 | Limberg et al. . |
| 5,483,370 | 1/1996 | Takahashi . |
| 5,487,084 | 1/1996 | Lindholm . |
| 5,506,781 | 4/1996 | Cummiskey et al. ................... 364/459 |
| 5,506,981 | 4/1996 | Madter . |
| 5,507,291 | 4/1996 | Stirbl et al. . |
| 5,521,767 | 5/1996 | Weng et al. . |
| 5,523,764 | 6/1996 | Martinez et al. . |
| 5,524,103 | 6/1996 | Shimizu et al. . |
| 5,535,356 | 7/1996 | Kim et al. . |
| 5,557,241 | 9/1996 | Burke . |
| 5,559,777 | 9/1996 | Maeda et al. . |
| 5,559,809 | 9/1996 | Jeon et al. . |
| 5,561,389 | 10/1996 | Duley . |

FOREIGN PATENT DOCUMENTS 0461557   7/1991   European Pat. Off. .

OTHER PUBLICATIONS

Timing a National Telecommunications Network Using GPS, Proceedings of the 6th European Frequency and Time Forum held at ESTEC, Noordwijk, NL, 17–19 Mar., 1992 (ESASP–340, Jun. 1992).

Austron Model 2202 Primary Reference Source Loran Assist Module Option P/N 12812339 User Guide Supplement P/N 12712341-2, Revision B, Jul. 1992.

(List continued on next page.)

*Primary Examiner*—Bernard Roskoski
*Attorney, Agent, or Firm*—Loeb & Loeb

[57]   ABSTRACT

Methods and apparati are disclosed for providing disciplined clock signals at a plurality of nodes located throughout a network. In the preferred embodiments, a plurality of clocks are ensembled to provide ensemble time base information. A universal clock signal such as from a global positioning satellite (GPS) or Loran receiver is also provided and the ensembled time information is disciplined to the frequency or the phase of the universal clock signal to provide syntonization or synchronization throughout the network.

27 Claims, 8 Drawing Sheets

OTHER PUBLICATIONS

Timing Solutions Corporation, FaultTolerant Timing System, 6 Nov. 1992.

Sifting Through Nine Years of NIST Clock Data with TA2, Marc A. Weiss, Time and Frequency Division, MIST and Thomas P. Weissert, LiteroPhysics.

AT&T's New Approach to the Synchronization of Telecommunication Networks, Apr. 1989, IEEE Communications Magazine.

Synopsis of Timing Measurement Techniques Used in Telecommunications, Proceedings of the 6th European Frequency and Time Forum held at ESTEC, Noordwijk, NL, 17–19 Mar., 1992 (ESASP–340, Jun. 1992).

Innovation in GPS Time Measurement; 8080 Wescom Conference Record, 36(1992)Nov. 17–19, No. Hollywood, CA, USA; Sam McCutcheon, Pres., Autek Systems Corporation, 4949 Viewridge Avenue, San Dirgo, CA 92123.

Automatic Hierarchy Control Ove Stratum 1 Redundant Time & Frequency Systems; Peled, Zelitzki, and Nemesh; Forth–Fifty Annual symposium on Frequency Control; Publication Date May 29, 1991.

Butterline, Abate and Zampetti, Use of GPS to Synchronize the AT&T National Telecommunications Network.

AT2, A New Time Scale Algorithm: AT1 Plus Frequency Variance; M. Weiss and T. Weissert, Metrologia 1991, 28, 65–74.

DISCIPLINED TIME SCALE GENERATOR FOR PRIMARY REFERENCE CLOCKS

NOTICE OF COPYRIGHTS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates to time scale generation and particularly relates to traceable time scale generation.

2. Background of the Invention

In many applications such as telephone networks, power networks, and computer networks, clock signals are generated for controlling timing. For instance, LOw frequency, RAdio Navigation (Loran) and Global Positioning Satellites (GPS) may be used as clock sources. Although Loran and GPS provide inexpensive and precise time scale sources, there are several drawbacks that have resulted in such sources not generally being used. Typically, Loran and GPS master clocks are considered undesirable because the communication link to the source—a radio signal—provides a relatively noisy communication link. Such noisy communication links result in injecting noise into the master clock as perceived at the node. Typically, rather than using these external timing sources, many of these clock signals are generated at each switch or node in the network. Clock signals generated at a switch or node provide a local time base for tracking and controlling the relative occurrence of events. Examples of such time scale generators include ceramic oscillators, crystal oscillators, quartz oscillators, rubidium oscillators, and cesium oscillators. Cesium oscillators, which are so-called primary atomic clocks, typically provide time base references with the highest degree of precision, accuracy and stability, but at the greatest cost.

Each of these prior art oscillators may be used as a local time base generator and has a precision and stability that may depend on a variety of factors such as temperature, noise, system biases, etc. When it is necessary for many of the nodes of the network to communicate with each other, there typically is a requirement that these individual nodes have to be operating in synchronization or syntonisation with each other. Synchronization means that measured against some reference, there is a specific timing (phase and frequency) relationship with a given level of precision between the clocks at two different nodes. Syntonisation means that measured at a given level of precision the frequency of the clock sources at two different nodes is the same.

Various types of master or reference sources may be used. For example, the master clock source such as a cesium clock may be a cesium oscillator that is distributed over the network to each node. Each node in the network may incorporate a less stable oscillator such as a rubidium oscillator and receives the master clock signal over a communication link.

To lock such oscillators to the master or reference clock source, various high precision phase and frequency locked loops such as the Stratum Model ST2, ST3 and ST3E which are available from the assignee of this application have been developed. These clock circuits provide high precision tracking of the reference or master signal with accuracy in the range of one part in $10^{11}$ over a day. However, depending upon the amount of precision and accuracy desired, the use of these oscillators results in increased complexity and greater cost.

The most common method of obtaining synchronization or syntonisation is to use phase locked loops or frequency locked loops, respectively, that are locked to a reference or master clock signal that is distributed throughout the network. A disadvantage of such distribution of a master clock signal throughout the network is that noise in the communication link and/or various error sources in the phase or frequency locked loop may cause timing (phase) errors or frequency errors in the network. Such timing or frequency errors result in slippage in the timing of data or other types of information frames between various nodes. Where phase or frequency errors occur, this may result in slippage of, for example, timing intervals, resulting in the loss of data.

As a further means of improving local time scale generation, various processes have been developed for improving stability. One common method for improved time scale generation is to have several highly accurate different sources such as oven-based rubidium oscillators and average the signals of the oscillators to try to minimize errors statistically.

A further improvement of such averaging techniques is ensemble time base generation. In ensemble time base generation, a variety of clock and other time base sources are provided. Rather than taking a simple mathematical average of the timing source, various weighing factors are taken into account for generation of the time scale based upon either the predicted or measured accuracy and stability of the various different time sources. There are several examples of ensemble time scale generation methods including public domain methods such as the AT1 and the AT2, which were developed by the National Institute of Standards and Technology (which is part of the United States Department of Commerce) and described in M. Weiss & T. Weissert, "AT2, A New Time Scale Algorithm: AT1 Plus Frequency Variance," Metrologia No. 28 p. 65–74 (1991).

Nonetheless, ensemble time scale generation fails to provide either synchronization or syntonisation. Therefore, it is a first object of this invention to provide a synchronizable or syntonisable time scale generator to provide synchronization or syntonisation throughout a network. It is a further object to provide a time scale generator using a straightforward and relatively inexpensive architecture. It is a further object to provide a disciplined time scale generator that disciplines the ensemble time source to a reference clock. It is yet a further object of the invention to use GPS timing to provide the reference or master clock signal.

SUMMARY OF THE INVENTION

These and other objects are accomplished through embodiments of disciplined, ensemble time scale generators. A plurality of nodes in the network has a variety of time scale generators available such as a plurality of rubidium oscillators, a cesium oscillator and a network clock transmitted from a master clock at another node. The plurality of clocks are ensembled to provide an ensemble time scale generator having good stability due to the statistically based dependency upon a plurality of reliable sources. These ensembled clocks are then subjected to frequency discipline from a clock source having fundamentally better long-term stability and accuracy that is available throughout the network. An example of such a time source is GPS. In addition, the frequency disciplined time scale may then be further subjected to time discipline from this same highly reliable clock source, providing synchronization.

A reliable core hardware engine architecture is disclosed that permits efficient implementation of frequency and time scale discipline of the ensembled clock sources by a microprocessor implementation. This architecture requires a GPS receiver, a pair of multiplexers with each multiplexer coupled to the various local, network and Universal Disciplining Clocks, a digital synthesizer coupled to the output of the first multiplexer, and a time interval measuring device such as a start/stop counter having a start input coupled to the output of the second multiplexer and the stop output coupled to the synthesizer. This core architecture engine uses a microprocessor that processes the appropriate input signals to obtain the ensembled time information and then frequency disciplines the ensembled time information to provide a frequency disciplined time base signal. Alternatively, a time (phase) disciplined time base signal may be provided.

DETAILED DESCRIPTION OF THE PREFERRED EMBODIMENTS

Figure 1:
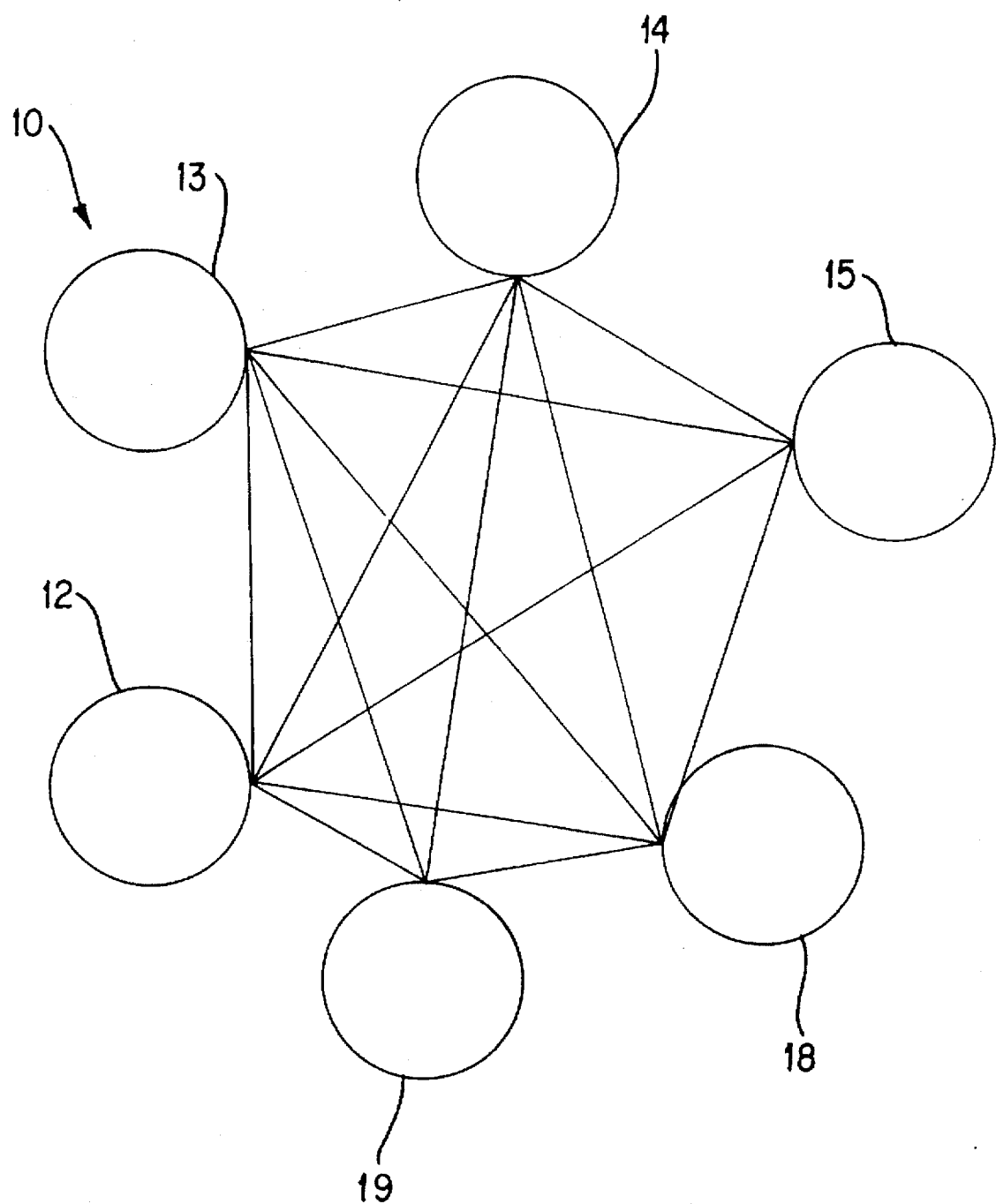
FIG. 1 is a block diagram showing a network embodiment of the invention.

FIG. 1 shows a network 10 having one or more nodes embodying the invention. The network comprises a plurality of nodes 12, 13, 14, 15, 18 and 19 communicating with each other over one or more transmission channels 20, 21, 22, 23, 24, and 25, and the nodes may comprise telephone switching offices. Each node has a plurality of clock sources, which may include two rubidium oscillators (RbA and RbB) such as in the ST2 available from the assignee of this application, one or two quartz oscillators such as the ST3E available from the assignee, a cesium oscillator (CS), a global positioning satellite receiver (GPS) providing a GPS clock output, and a network oscillator source transmitted from another node serving as the master clock. Each node may also have other clock sources such as a Loran (not shown).

Figure 2:
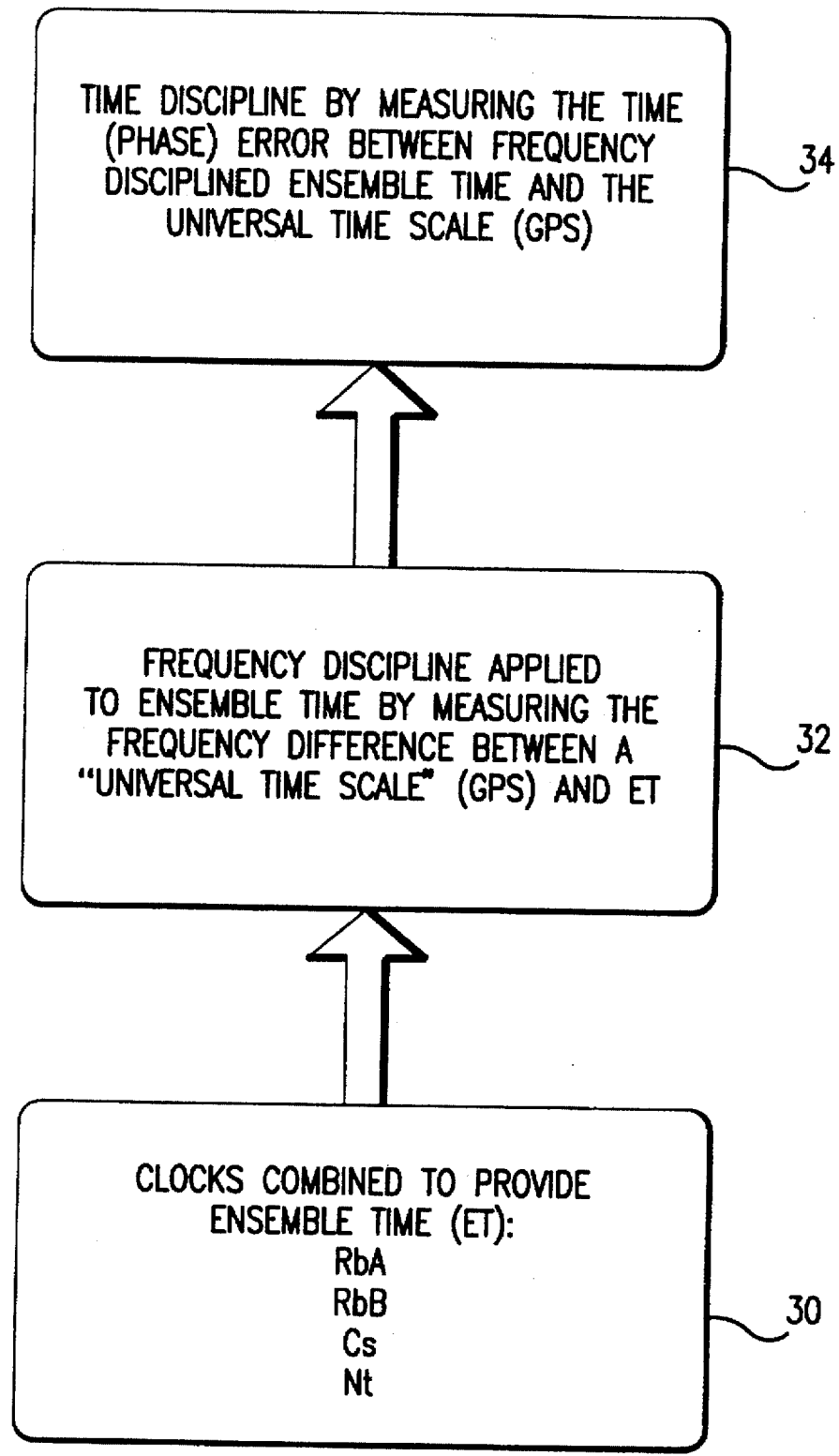
FIG. 2 is a hierarchical process diagram for an embodiment of the invention used in a node in a network.

FIG. 2 shows the basic operation of a network node containing an embodiment of the disclosed invention. The plurality of clock sources such as the two local rubidium clocks RbA and RbB, a local cesium clock Cs and a network clock Nt, which may be a rubidium clock at another node in the network, are ensembled 30. The ensembling is well known to those of skill in the art according to established protocols using a software engine and is preferably according to the AT2 protocol set forth in M. Weiss & T. Weissert, "AT2, A New Time Scale Algorithm: AT1 Plus Frequency Variance," *Metrologia* No. 28 p. 65–74 (1991), which is incorporated by reference as if fully set forth. In the AT2 protocol, the degree to which a given clock source contributes to the overall time scale may be managed by both a priori estimates of clock stability as well as by on-going measurement of clock stability. In the standard embodiment of AT2, the integration time of the frequency state estimates is largely determined by an a priori estimate of each clock's level of random walk frequency modulation noise, while the weight of each clock's contribution to the time state is determined adaptively based on measured levels of white noise frequency modulation. In general all time scale algorithms share as a common basis a standard clock model and time scale generation equations. The variation is in the methodology used to control the weights and integration times used. This embodiment encapsulates the particular time scale algorithm as a fully independent component. The precise manner in which the time scale algorithm is managed is not critical. For example, in certain applications of this embodiment, considered by the assignee, both the weights and integration times are determined a priori. The output of this first stage is an ensemble time scale clock or clock state information that is based upon the available clock sources.

The node then provides frequency disciplining to the ensembled time scale by determining 32 the frequency error between the ensemble time and a "Universal Disciplining Clock" (UDC), which may, for example, be the clock reference signal transmitted in a global positioning satellite signal as detected by a GPS receiver (not shown). Alternatively, for networks occupying a smaller geographic area, Loran may be used. The measured frequency error is then used to generate a frequency correction factor to alter the frequency of the ensemble time scale over a long time interval such as several hours to that of the UDC. If each node in the network includes the disciplining of the ensembled time scale to the UDC, then the network will be in syntonisation, meaning the frequency of the disciplined time scales at each network will be the same with a very high degree of precision.

Further, as shown in step 34, the frequency disciplined time scale provided may also be time disciplined. Time disciplining differs from frequency disciplining in that it removes the phase error between the frequency disciplined ensemble time and the Universal Disciplining Clock such as GPS. Time disciplining occurs over a much longer period of time to minimize data frame slippage.

Figure 3:
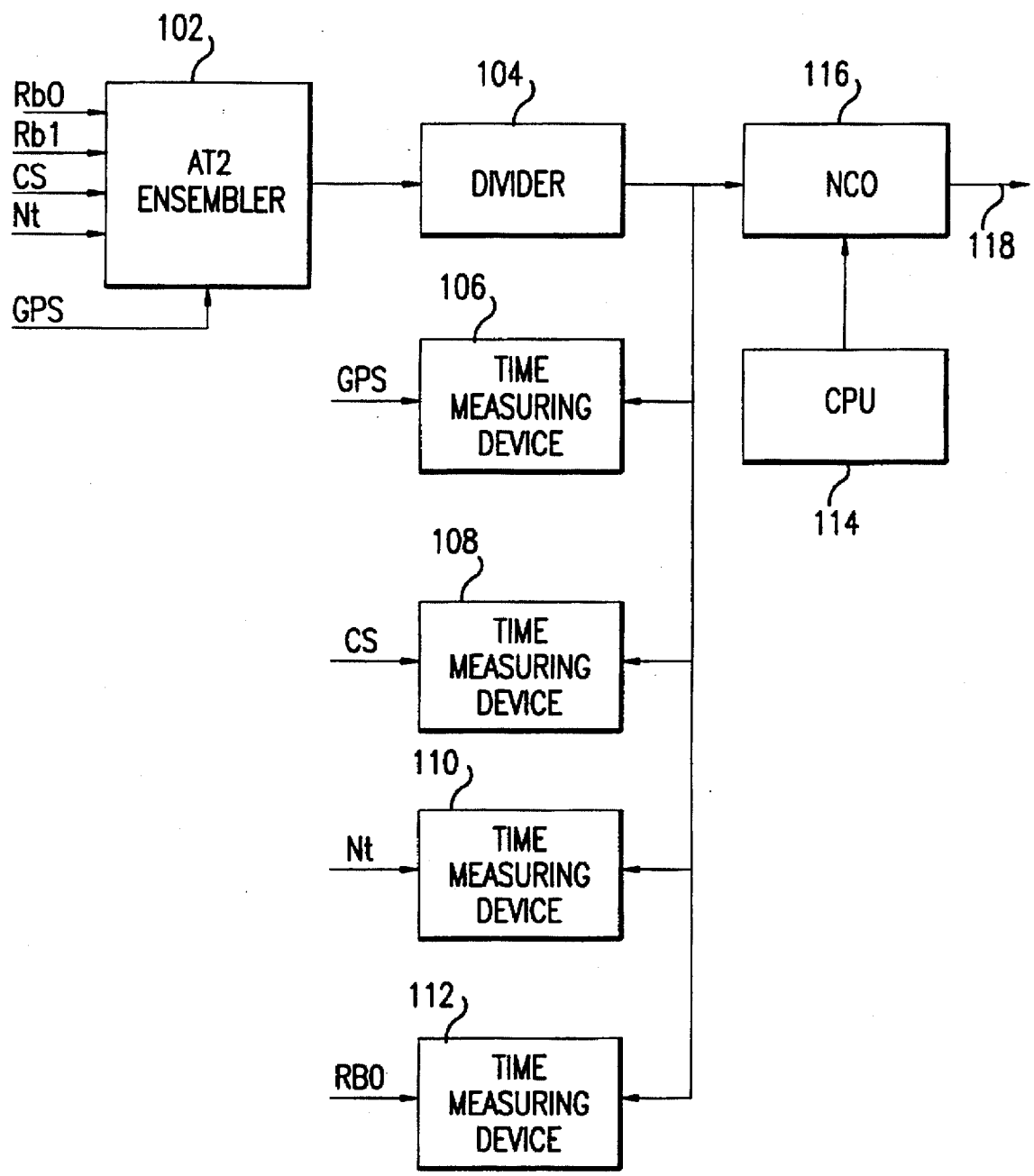
FIG. 3 block diagram of a further embodiment of the invention for a node in a network to provide syntonisation.

FIG. 3 shows an embodiment 100 with such ensembling and disciplining in block diagram form. An ensembler 102 has as its inputs each of the available clock sources including two rubidium clocks (Rb0 and Rb1), a cesium clock (Cs), a network clock (Nt) and, optionally, a Global Positioning Satellite clock (GPS) provided from a GPS receiver. The output of the ensembler is preferably a 20 Mhz clock signal, which is then divided down to provide a four Khz clock signal (for telephone applications) by divider 104.

The four KHz output from the divider 104 is provided to four time interval measuring devices 106, 108, 110 and 112, which may comprise start/stop counters. Time measuring device 106 measures, during a sampling interval, the phase difference between the GPS clock signal and the ensembled time. Time measuring devices 108, 110 and 112 measure the phase difference between the ensemble time and the cesium (Cs), network (Nt) and RbA clocks respectively. Each of these time measuring devices may be a start/stop counter driven by a clock signal that measures the prescribed time (phase) difference between the start (one of the RbA, Cs and Nt clocks) signals and the stop signal (ensemble time).

The phase difference from each one of these time measuring devices 106, 108, 110 and 112 during a sample interval provides a count value. That count value may be processed over a particular interval by a microprocessor (CPU) 114 using frequency error estimate techniques that are well known in the field. That frequency error estimate is then mathematically altered by a filtering function performed in the microprocessor 114 to provide a correction factor to alter the output frequency of a first numerically controlled oscillator 116. The numerically controlled oscillator 116 alters the frequency of the four KHz signal to provide a frequency disciplined time scale output 118.

To obtain disciplined time scale throughout a network, a GPS clock signal from a GPS receiver will typically be selected as it has extremely good long-term stability and accuracy and on average is available virtually everywhere on earth. Thus, the GPS signal serves as a Universal Disciplining Clock. To perform the disciplining, the counts from the time measuring device that measures the phase difference between the disciplining time source and from the ensembled time are sampled and stored from time to time by the CPU. The samples are then processed by the CPU for altering the correction factor for the numerically controlled oscillator. For a disciplining time source such as GPS, the frequency control loop time constant is typically on the order of several hours while for a more short-term stable disciplining source such as a Loran signal time scale, the time interval for disciplining may be much shorter, such as on the order of an hour. Where a cesium clock having high short-term stability is being used in the absence of a UDC, the interval may be only a few minutes. The updating of the time estimate may be done every 25.6 seconds.

It should be noted that the CPU can also monitor the various clock signals, including the various local clocks, such as RbA and Cs, and the UDC's, such as GPS and Loran, to determine the various clocks' performance. If the microprocessor, for example, starts noting significant and varying changes in phase between any of these various clocks and ensemble time, indicating that the reliability and stability of that particular clock has decreased appreciably, the clock may be discounted by the ensembler. Similarly, if the CPU notes that there has been a significant decrease in the stability of the Universal Disciplining Clock such as GPS or Loran, the CPU may select a different Universal Disciplining Clock. In either event, the CPU may cause a fault indicator to be activated on a display either at the network node containing the CPU 114 or at a remote location elsewhere in the network.

Still further, a majority vote criteria may be used to control the weight assignment for each of the available input signals. Such voting may be done after each estimate. Although the Universal Disciplining Clock is less stable over the short term, it still may be used in this voting to assign the weights because it will help detect local clocks that have become unstable.

Figure 4:
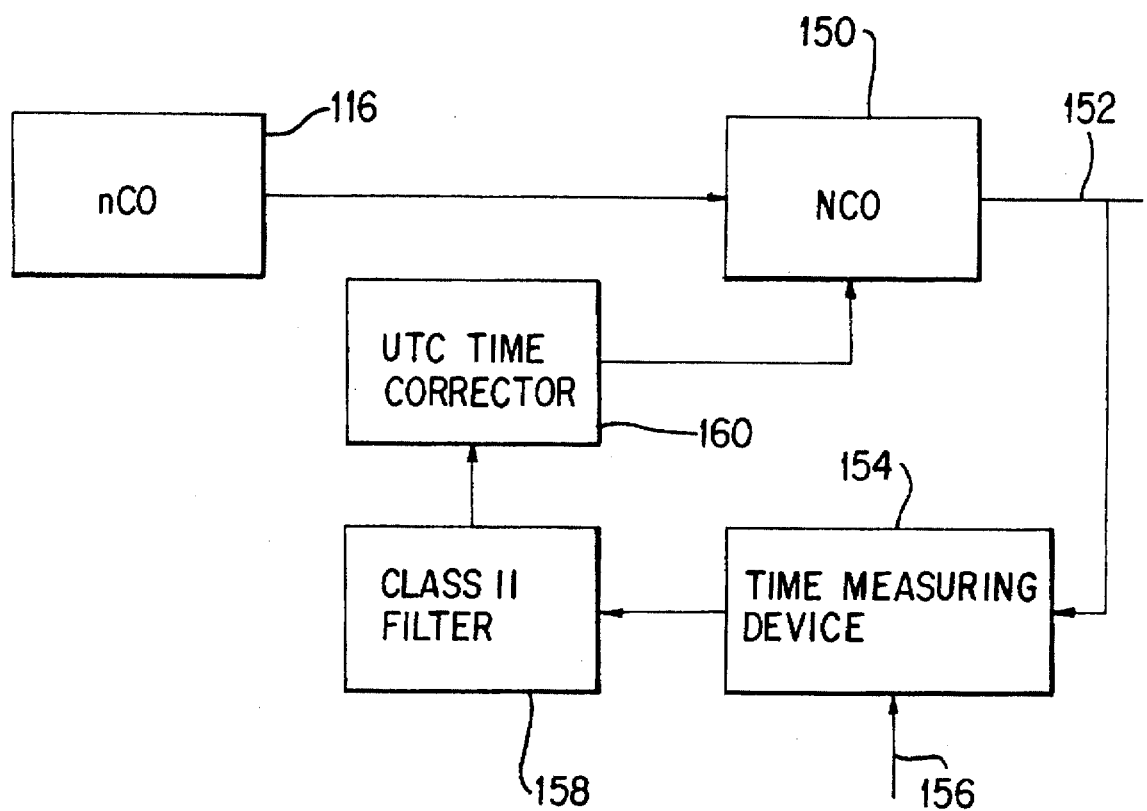
FIG. 4 is a block diagram of additional components that may be combined with the embodiment of FIG. 3 to obtain synchronization.

FIG. 4 is a further modification to the embodiment of FIG. 3 that takes the frequency disciplined output from the oscillator 116 and provides synchronization to the selected universal time source such as GPS. In particular, the syntonised output 118 from the oscillator 116 of FIG. 3 is provided to a second NCO 150. The output 152 of the second NCO 150 is coupled to the time measuring device 154 that measures the phase difference between the output of the second oscillator 150 and the selected UDC time source 156 such as the GPS clock signal that has been selected for obtaining syntonisation. The output of the time measuring device 154 is provided to the input of a digital filter 158 to provide an output indicating the average phase difference between the syntonised time from the second NCO 150 and the UDC time source. The average short-term stability of the UDC source and the long-term stability of the ensemble time scale will determine the time constant of the filter 158, which may be adjustable. Therefore, for a relatively short-term unstable UDC source such as GPS, the time constant should be fairly long; i.e., in the order of a day. When in the absence of a UDC time source, a local cesium clock having more short-term stability is used, the filtering time constant can be much shorter. Thus, by phase locking the second NCO 152 to the average phase of the GPS, or other UDC time source, synchronization between the nodes within the network having the disclosed embodiments can be attained.

For all other nodes in the network that have the embodiment of FIG. 4, full synchronization for all such nodes is attained. It should be noted that to avoid unnecessary slippage of frames, the phase correction of the frequency disciplined time scale clock signal from the oscillator 150 by the second oscillator 152 should be much slower than the frequency correction.

Figure 5:
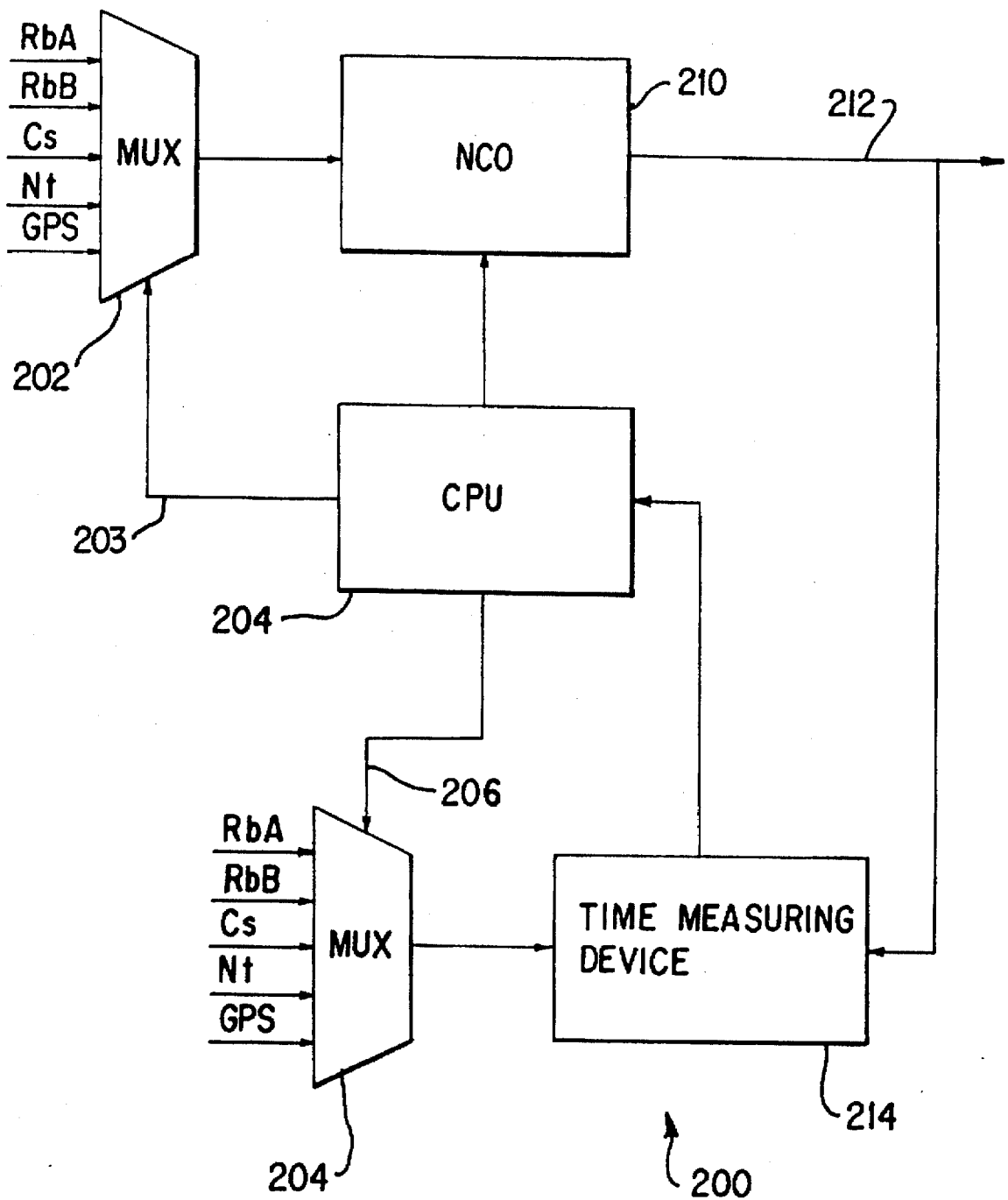
FIG. 5 is a block diagram of an additional embodiment of the invention.

FIG. 5 shows a further embodiment 200 of a disciplined time scale with a more efficient architecture. Each of the clock sources, such as the local time sources rubidium A (RbA) and rubidium B (RbB), a cesium atomic clock (Cs) and the Universal Disciplining Clock source, which is preferably GPS, and any other time sources such as a network time source (Nt), are provided to two multiplexers 202, 204. The selected output of the multiplexers 202, 204 is controlled by a central processing unit (CPU) 206, which may be any high speed microprocessor and is preferably a digital signal processor. Control line 203 is generally not changed unless the selected input becomes unstable. Ordinarily, control line 203 is set to select as the output of multiplexer 202 the most reliable and stable short-term time source available as determined by the CPU 206, which is typically the cesium time source (Cs). Selection of a different time source such as one of the rubidium time sources (RbA and RbB) only occurs if the CPU 206 determines that the previously selected source has become unstable or if there is no cesium in the office. The selected time source is provided as an input to the synthesizer 210, which may be an NCO or swallow counter.

An output 212 of synthesizer (Synt) or NCO 210 is fed back to an input of a start/stop time measuring device 214. The other input of the time measuring device 214 is coupled to the output of the second multiplexer 204. Under CPU 206 control over control 205, multiplexer 204 periodically (from time to time) provides a control signal to provide a different time source for comparison by the time measuring device. Thus, the time measuring device provides successive phase measurements or samples of the following at sampling intervals controlled by the CPU 206, from which the following is calculated:

TABLE 1

| |
| --- |
| ΔX(RbA-Synt) |
| ΔX(RbB-Synt) |
| ΔX(Cs-Synt) |
| ΔX(Nt-Synt) |
| ΔX(GPS-Synt) |
| ΔX(Counter Bias) | where ΔX is the incremental time error (phase error normalized with respect to the nominal frequency) measured over the sampling period which is proportional to the frequency difference between the two time bases within the parentheses; and where ΔX (Synt-Synt) is a measure of the incremental time offset in the timing measurement device to permit the CPU 206 to compensate for this offset variation as a function of temperature and other environmental factors; it is measured by applying an input clock to the start and stop terminal of the counter; and where Synt is the output of the synthesizer.

The CPU 206 may through simple manipulation obtain a "pairwise" difference matrix independent of the synthesizer input. For example, the pairwise difference between successive samples of the RbA and RbB time sources may be attained by the following as the synthesizer frequency component may be canceled by subtraction:

$$\Delta X(RbA - Synt) - \Delta X(RbB - Synt) \over \Delta X(RbA - RbB)$$

With summation the incremental time error pairwise data can be converted to time error data which is normally used in time scale algorithms $$X(RbA-RbB) = \Sigma \Delta X(RbA-RbB)$$

Each of these pairwise differences between successive samples of the different time sources can be obtained in a like manner by the CPU 206 to provide a pairwise matrix as shown in Table II, where i and j are the indices for the pairwise matrix:

TABLE II

| j/i | 1 | 2 | 3 | 4 | 5 |
|---|---|---|---|---|---|
| 1 | X(RbA–RbA) | X(RbA–RbB) | X(RbA–Cs) | X(RbA–Nt) | X(RbA–GPS) |
| 2 | X(RbB–RbA) | X(RbB–RbB) | X(RbB–Cs) | X(RbB–Nt) | X(RbB–GPS) |
| 3 | X(Cs–RbA) | X(Cs–RbB) | X(Cs–Cs) | X(Cs–Nt) | X(Cs–GPS) |
| 4 | X(Nt–RbA) | X(Nt–RbB) | X(Nt–Cs) | X(Nt–Nt) | X(Nt–GPS) |
| 5 | X(GPS–RbA) | X(GPS–RbB) | X(GPS–Cs) | X(GPS–Nt) | X(GPS–GPS) |

(Of course, for computational ease, the pairwise differences of the samples along the matrix diagonal ($X_{j,j}$) running from top left to bottom right (the axis of symmetry) need not be calculated as these values are naturally zero. Also, the pairwise differences below the matrix's axis of symmetry can be obtained by simple two's complement mathematics, as is readily apparent.)

Each of the pairwise matrix components may then be provided to any of several well known time scale software engines to provide state estimates for the time and frequency difference of each input with respect to ensemble time. The state estimates of the ensemble time are produced by the CPU 206 and stored in RAM and the state estimate of the ensemble time is the computational analog of the ensemble time provided to the time measuring devices in the embodiment of FIG. 3. The output of the time scale algorithm provides the correction factors needed to compensating any of the inputs onto ensemble time. In this embodiment, this compensation is performed directly on the synthesizer output.

The control of the synthesizer output combines the correction needed to compensate the output onto ensemble time scale and the correction needed to compensate the ensemble timescale onto the long term UDC frequency in a single algorithm. Before describing this control servo algorithm, the disciplining frequency correction calculation is described.

The disciplining algorithm utilizes the timescale incremental time state estimate for the selected UDC input to determine the disciplining frequency correction. The disciplining calculation is performed at the same update interval as the timescale algorithm. In the case that GPS is the UDC source, the timescale algorithm will assign the GPS timing input zero weight. This is desirable since the GPS timing signal is much less stable in the short term than the local oscillator sources (such as two local robidiums). The timescale algorithm will provide state estimates for a zero weight input without allowing it to influence the actual output timescale.

The disciplining algorithm implements a digital low pass filter on the incremental UDC time state estimate to reduce the excessive phase noise on this signal. The filter output is decimated so that the disciplining frequency correction factor is updated every nth timescale state update cycle. In the case of GPS, the nominal integration time of the filter is 30 minutes, and the disciplining frequency correction factor is updated nominally every 30 minutes. The digital lowpass filter is implemented to avoid truncation and round-off error.

The digital filter output is the current disciplining frequency estimate. This current estimate is compared to the previous. If the two estimates agree within the expected qualification threshold then the current estimate is accepted. An accepted estimate is given as input to an experimental smoothing filter to calculate the disciplining frequency correction. The time constant of the filter is selected to minimize the frequency instability of the overall output. This is constrained a follows: For short time constants, the insta- bility of the UDC source, and for long time constants the instability of the timescale aominates. In the case of GPS, a nominal two hour time constant provides operation in the region of maximum frequency stability for rubidium local oscillators.

Given the timescale state estimates, and the calculated discipling frequency correction, the control servo algorithm to steer the single synthesizer in this embodiment can be desired. Assume for this explanation that the input to the synthesizer 210 is selected to be RbA via multiplexer 202. The synthesizer control word is the sum of a frequency control word (FCW) and a phase control word (PCW).

The frequency control word is calculated directly from the timescale frequency state and the disciplining frequency correction as follows:

$$FCW = -[\hat{Y}(RbA-ET) + \hat{Y}(ET-UDC)] \qquad 1$$

where Y is the fractional frequency error of the clock with respect to its nominal frequency and is therefore measured in parts per million; $\hat{Y}$ is the estimation of the true fractional frequency error; where $\hat{Y}$ (RbA-ET) is the timescale frequency state estimate for the RbA input and $\hat{Y}$ (ET-UDC) is the current disciplining frequency correction.

The frequency control word can be viewed as the open loop or feed forward compensation to correct the output synthesizer to nominally correct frequency. The phase control word (PCW) provided to the NCO is the closed loop correction feedback factor to remove any residual error resulting from small bias and resolution effects associated with the hardware NCO (SYNT). The phase control word is calculated as follows:

$$PCW = \propto (\text{Residual Time Error}) \qquad 2$$

where $\propto$ is the proportional time constant.

The residual time error is determined by comparing the measured time error between the output and input to the hardware synthesizer (NCO) with respect to the calculated expected phase ramp.

tonisation with a Universal Disciplining Clock. In addition, if desired, the CPU 206 can also compute the appropriate phase increment update according to these engines to provide synchronization.

A further improvement for use with this approach is the use of an incremental pairwise matrix instead of the pairwise matrix shown in Table II above. The incremental pairwise matrix comprises the differences between successive pairwise samples:

$$\Delta X_{j,i}(t+\tau) = X_{j,i}(t+\tau) - X_{j,i}(t) \qquad 6$$

where $X_{j,i}(t)$ is the j,i element of Table II at time sample interval t; and where $X_{j,i}(t+\tau)$ is the same j,i element of Table II at the next time sample interval t+τ.

Thus, the delta pairwise matrix is defined at Table III below:

TABLE III

| j/i | 1 | 2 | 3 | 4 | 5 |
|---|---|---|---|---|---|
| 1 | ΔX(RbA–RbA) | ΔX(RbA–RbB) | ΔX(RbA–Cs) | ΔX(RbA–Nt) | ΔX(RbA–GPS) |
| 2 | ΔX(RbB–RbA) | ΔX(RbB–RbB) | ΔX(RbB–Cs) | ΔX(RbB–Nt) | ΔX(RbB–GPS) |
| 3 | ΔX(Cs–RbA) | ΔX(Cs–RbB) | ΔX(Cs–Cs) | ΔX(Cs–Nt) | ΔX(Cs–GPS) |
| 4 | ΔX(Nt–RbA) | ΔX(Nt–RbB) | ΔX(Nt–Cs) | ΔX(Nt–Nt) | ΔX(Nt–GPS) |
| 5 | ΔX(GPS–RbA) | ΔX(GPS–RbB) | ΔX(GPS–Cs) | ΔX(GPS–Nt) | ΔX(GPS–GPS) |

The incremental time error is:

| | |
|---|---|
| ΔX (RbA–Synt) | Measured incremental time error between RbA and Synthesizer (input and output of Synthesizer) |
| + ΔX (CounterBias) | Compensation term for incremental bias in time measuring device |
| ΔX (RbA–Synt¹) | Measured incremental corrected time error |
| ΔX (RbA–Synt¹) | is the compensated measured incremental phase ramp. |

The calculated expected time error can be determined from the timescale frequency state and the discipling frequency correction, and is proportional to the negative of the frequency control word:

$$\Delta \hat{X}(RbA-UDC) = [\hat{Y}(RbA-ET) + \hat{Y}(ET-UDC)] \Delta T \qquad 4$$

where ΔT is the timescale update interval.

The incremental residual time error is the difference between the measured corrected incremental time error and the calculated incremental time error:

$$\Delta X(\text{ResidualTime}) = \Delta X(RbA-Synt) - \Delta \hat{X}(RbA-UDC) \qquad 5$$

The residual time error is the summation of the incremental residual time error. The phase control time constant is selected based on the measurement noise in the time measurement device and the bias and resolution efforts in the hardware synthesizer. Typically a time constant in the range of 100 to 1000 seconds will achieve the desired stability.

The output of the synthesizer can be controlled by the CPU 206 according to standard algorithms to provide ensembled time based upon the two rubidium clocks, one cesium and one network clock available from the matrix. Further, the same time scale engine can use the ensemble time and the frequency differences between the computed ensemble time and the averaged received GPS signal to generate a frequency disciplined time base to provide syntonisation with a Universal Disciplining Clock. In addition, if desired, the CPU 206 can also compute the appropriate phase increment update according to these engines to provide synchronization.

A benefit of using the delta pairwise matrix instead of the regular pairwise matrix of Table II above is that the range of the matrix values and the range of the state estimates for the time and frequency differences between the clock source and the synthesizer output have a significantly smaller range of values permitting the use of integer math, particularly with respect to the phase error.

Further, if time discipline in addition to frequency disciplining is required between the UDC and the output of the synthesizer, instead of outputting the frequency correction factor, a time correction factor may be calculated. This time correction factor can be derived by calculating the frequency disciplined time scale state and based upon the filtered, differential errors of the time measuring device between the GPS source and the output of the synthesizer, the correction factor may be calculated by the microprocessor for the phase error correction factor to provide synchronization.

A unique advantage of disciplining the clock source to GPS is that GPS is generally universally available throughout the geographic area of the network. Therefore, if each node in the network has a frequency disciplined clock such as shown in FIG. 3, then each of the nodes in the network is in syntonisation with the UDC time source (for example, GPS)—and the other nodes that are disciplined to the UDC time source.

Further, by using ensembling time scale, if the UDC time source such as GPS is lost due to, for example, solar flare activity, the use of disciplined ensembled time provides a highly stable local time source. Upon loss of the GPS or other UDC time source, due to the highly stable local time source provided by ensembled time, each node in the network can still maintain syntonisation and possibly even synchronization with the other nodes in the network for a substantial period of time. In particular, each node in the network may preferably upon detection of the loss of the UDC time source enter into a holdover state whereby each of the NCO's is held in a fixed state. Since the local time source for each node is an ensembled time, which is much more stable than each of the constituent time sources in the ensembled time scale, each node will stay in syntonisation with the other nodes for a substantial time interval until the UDC time scale, such as GPS, is reacquired.

Figure 6:
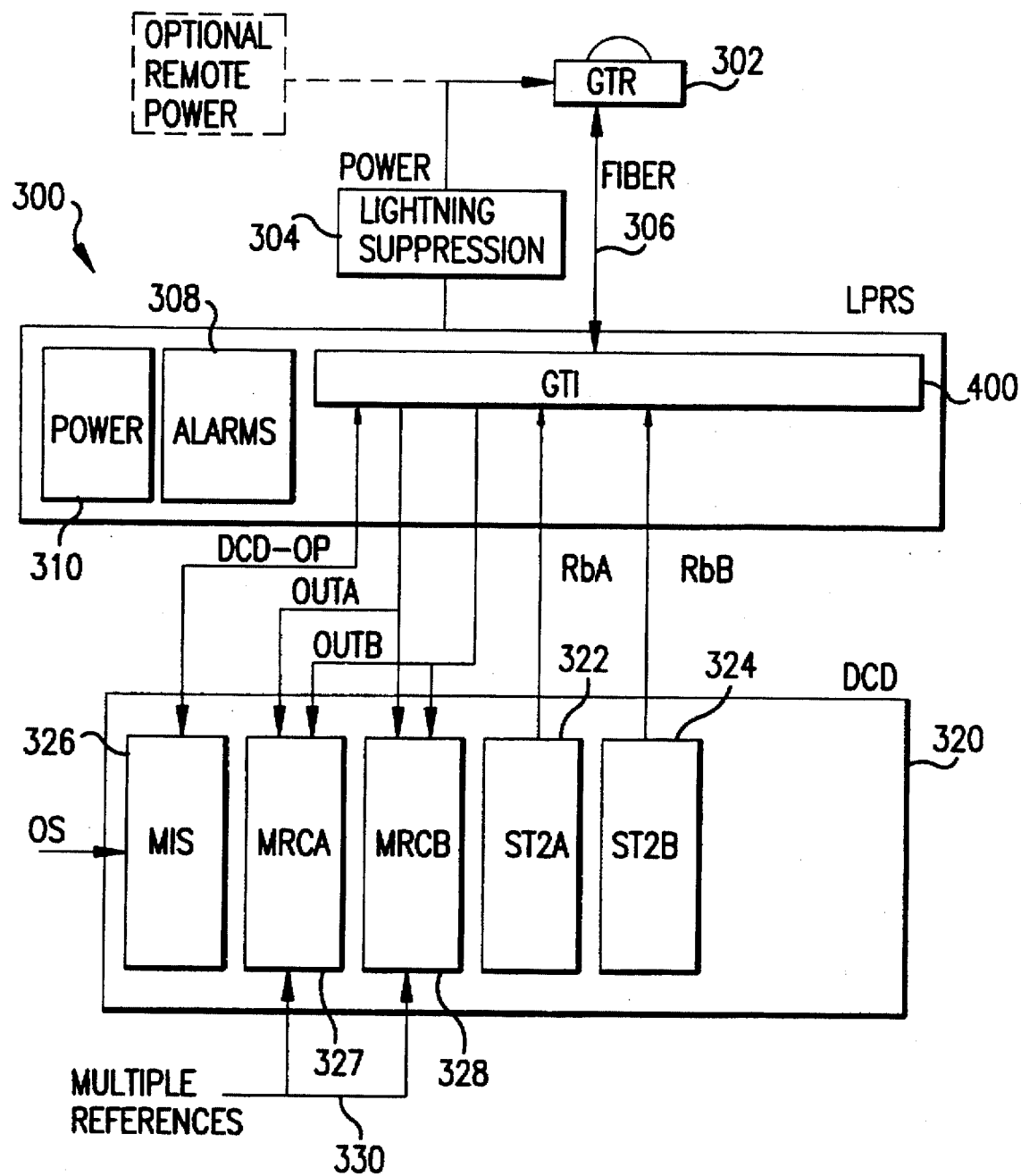
FIG. 6 is a block diagram of an additional embodiment of the invention.

FIG. 6 is a block diagram of a local primary reference source 300 using an embodiment of the invention. The source 300 is preferably coupled to a global reference positioning timing receiver (GTR) 302 designed to receive a global positioning signal and preferably mounted on the roof of the office where the local primary reference source 300 is located. The GTR 302 receives the global positioning signal from a satellite network and has a lightening suppressor 304, and a fiber cable link 306 to the office including the local primary reference source 300. The source 300 includes a global positioning timing interface 400 and various audio and visual alarms 308 for error conditions and a power supply 310. Also coupled to the source 300 is a digital clock distributor system (DCD) 320 such as is available from the Telecom Solutions division of Symmetricom, Inc. of San Jose Calif. The DCD 320 includes preferably two rubidium clock sources RbA and RbB that may be ST2's 322, 324 available from Telecom Solutions. Also included are a maintenance interface system 326 and multiple reference clock controllers A and B (MRCA 327 and MRCB 328) which may receive external multiple reference clock sources 330 and the outputs of the GTI for clock distribution throughout the office.

Figure 7A:
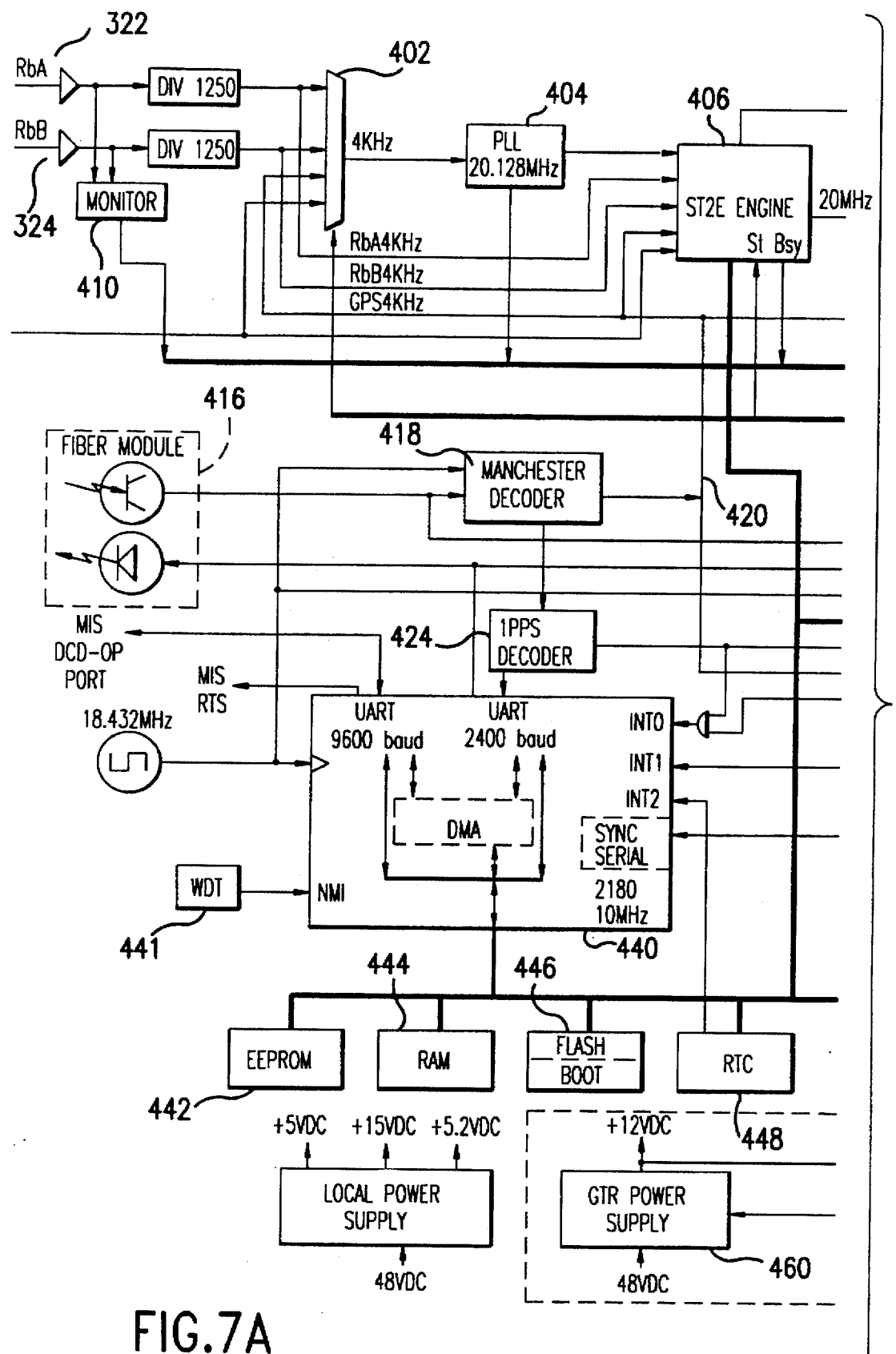
FIG. 7 is a block diagram of a local primary reference source for a telephone switching office.
Figure 7B:
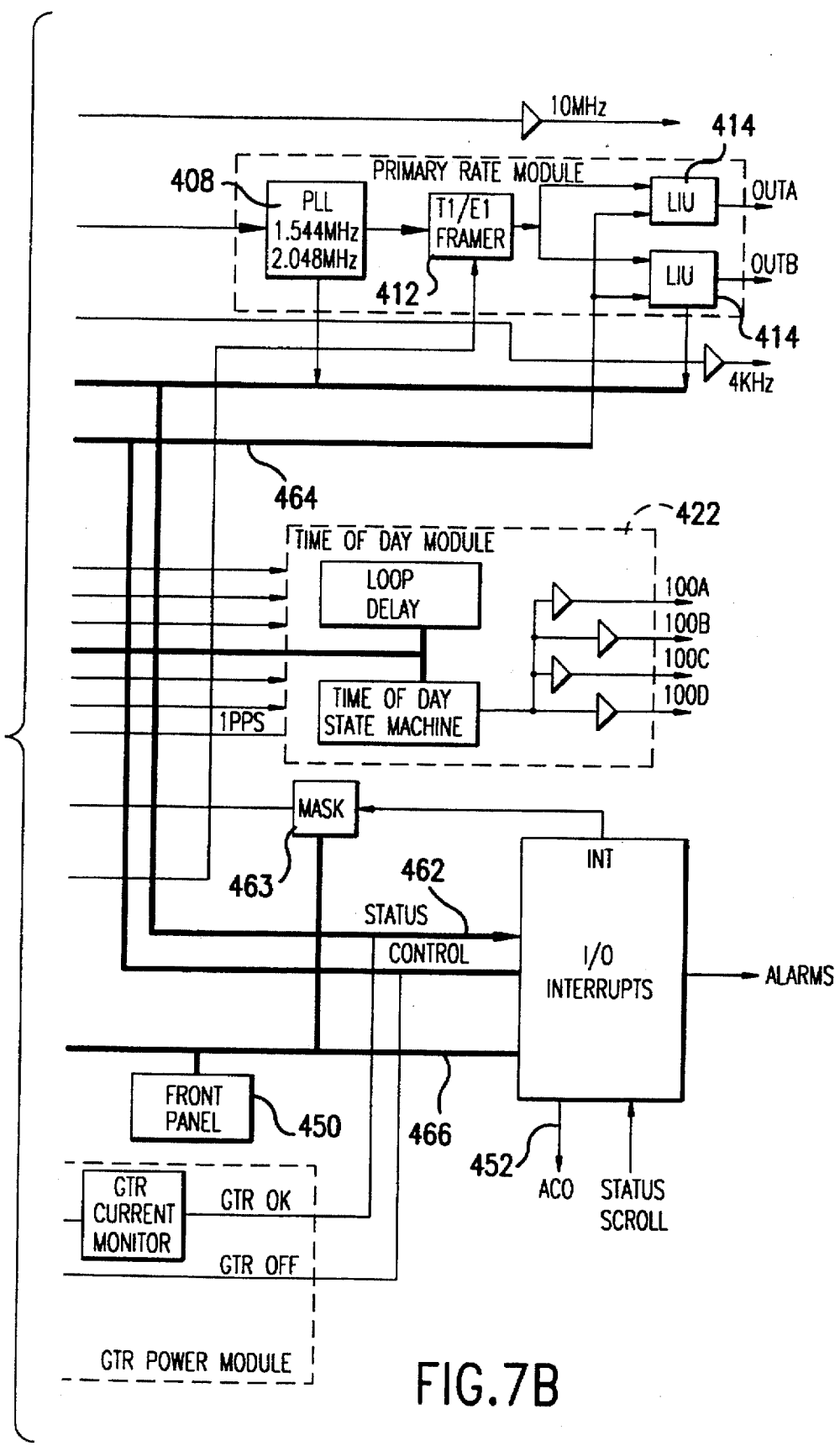

FIG. 7 shows a more detailed timing diagram of part of the LPRS 300. The 5 MHz square wave clock sources RbA and RbB are coupled to divide by 1250 dividers to provide 4 KHz signals RbA and RbB signals to selector 402. The output of the selector 402 is coupled to a 20.128 MHz phase lock loop that along with the 4 KHz RbA, 4 KHz RbB and UDC 4 KHZ signal from the GPS receiver are supplied to an ISAM 404 that is available from Telecom. Normally, the 20.128 MHz phase lock loop 404 is driven by one of the 4 KHz RbA and RbB signals.

The GTI utilizes the ISAM (integrated synthesizer and measurement) hardware engine to provide a cost effective and high performance disciplined timescale function. The GTI ISAM is designed to support up to five channels of phase measurement, and a 32 bit coherent digital synthesis integrated into a FPGA. The digital synthesizer is implemented without the use of a D/A converter. Instead, a digital mixer technique is employed to suppress synthesizer jitter and improve hardware resolution. The digital synthesizer has the following specifications:

1. Resolution: 1.4E-11 (Extended to 6E-15 by Steering Control Servo).
2. Jitter: <200 ps.
3. Nominal Output Frequency: 20 MHz.

The multi-channel phase measurement sub-system measures up to five input channels with respect to the synthesizer output. Each input channel is conditioned to be a sampling pulse train to the FPGA. The pulse train may be at rates of 4 KHz, 8 KHz, 16 KHz or 32 KHz. For rates lower than 32 KHz, the phase measurement is performed effectively at the 32 KHz harmonic frequency in the GRI, all input channels are at the 4 KHz sampling pulse rate. The nominal pulse width is 500 ns. The phase measurement sub-system has the following specifications:

1. Settling Time (Time after selecting an input channel until it is ready to be measured): 80 ms.
2. Single Shot Measurement Interval: <20 ms.
3. Single Shot Measurement Resolution: 640 ps.
4. Measurement Range: 31.25 microseconds (0 to BEC5 Hex on 16 bit I/O) from FPGA).

In the GTI, 4 phase measurement channels are utilized. The channel assignments are:

1. 4 KHz sampling strobe derived from local oscillator input A.
2. 4 KHz sampling strobe derived from local oscillator input B.
3. 4 KHz sampling strobe derived from GTR timing input.
4. 4 KHz sampling strobe derived from 20 MHz Synthesizer output (Calibration Channel).

A measurement cycle consists of collection one single shot measurement from each of the four channels. A measurement cycle is completed every 400 ms.

The numerically controlled oscillator and integrated phase measurement system comprises an ISAM engine 406 implemented in a gate array that is available from the Telecom Solutions Division of Symmetricom. The ISAM engine 406 provides two outputs, a 10 MHz output and a 20 MHz output that is in turn provided to a 1.544/2.048 MHz framer phase lock loop 408. Whether the loop 408 is operating at 1.544 MHz or 2.48 MHz depends upon whether the outputs are to be in a T1 or an E1 data format. The output of the framer PLL 408 is coupled to the T1/E1 framer 412 for distribution on output busses Out A and Out B by line interface units 414. The GPS 4 KHz signal is also made available at an output. If desired, the ISAM engine 406 may also receive a LORAN timing signal.

The 4 KHz GPS signal is supplied from the GTR 302 in the following manner. An optical sensor module 416 is coupled to fiber 306 and converts an optical pulse train from the fiber 306 into an electrical signal for decoding by a Manchester decoder 418 to provide the 4 KHz GPS signal for distribution over bus 420. The manchester decoder also receives an 18.432 MHz clock signal and provides a signal to the 1 pulse per second (1PPS) decoder 424 based upon a predetermined sequence contained within the signal from the GTR to provide a one pulse per second datum for use by a time of day module 422 that provides the time of day in a variety of different data formats. Data from the time of day module 422 may also be provided through the engine 416 to the GTR over the fiber 304. Time of day data may also be communicated serially from the engine 416 to a UART on the microprocessor 440.

Data may also be provided to the GTR 302 through the module 416 by the microprocessor 440 which preferably is a Z180 available from Zilog of Campbell, Calif. The microprocessor 440 preferably includes a 2400 baud UART for communication with the GTR 302 and a UART 9600 baud port that is coupled to the MIS 326 through a serial interface using the RS232 protocol. The 1PPS decoder 422 also provides a pulse once per second to the 2400 baud UART port. Preferably, the microprocessor has three hardware interrupts, INT0, INT1 and INT2 coupled respectively to the output of the 1PPS decoder 424 and the time of day engine, a maskable interrupt responsive to a status register in an I/O interrupt controller 452, a direct memory access (DMA) controller, and a serial port coupled to the framer 412. The framer 412 provides a framed all one's signal optionally in either a T1 (at 1.544 MHz) or E1 CC (at 2.048 MHz) format using either a Dallas Semiconductor DS2180A or DS2181 respectively, Also included are EEPROM 442 that may contain the program for the Z180, data RAM 444 for use by the processor, flash RAM containing the boot program 446, a real time clock module 448 such as a ICM 7170 available from Harris Semiconductor, and a front control panel 450 including a multi-line display module such as a DMC16101A. The EEPROM may be reprogrammed by transmitting data over the network to the MIS 326 for subsequent retransmission to the CPU 440. At a non-maskable interface, the microprocessor 440 is also responsive to a watch dog timer (WDT) 441. The I/O interrupt controller 452 is also coupled to generate both audio and visual alarms and to generate the alarm cut off output. There are both major and minor alarms that are used for alerting personnel either in the office or at remote locations of specific error conditions such as loss of or instability in the GPS signal, loss of or instability in the RbA and RbB signals, etc.

Preferably, not only does the GTI 400 include its own power supply but the GTI also includes the GTR power supply 460 that it may turn on and off. The GTI also monitors the current and the voltage for the GTR power supply over the status bus 462. Also coupled to the status bus are the monitor 410 that monitors the presence and stability of the RbA and RbB signals, the lock condition of the 20.128 MHz PLL 404, whether the ISAM engine 406 has completed a phase measurement signaled through the BSY line, whether the 1.544/2.048 MHz PLL 408 is in lock and whether the LIU's 414 are outputting data. The monitor 410 comprises a one shot set for each of RbA and RbB three 5 MHz clock periods (600 nsec) and can only be reset by the processor 440. The output of each one shots is coupled to the I/O controller 452 via the status bus 462. A low level indicates a failure of the RbA or RbB clock.

Control bus 464 is coupled to provide control from the I/O interrupt controller 452 to various components including the source for the selector 402, the enabling of the ISAM engine 408 and enabling the LIU outputs 414 and the GTR power supply 460. The ST input to the ST2 engine 408 permits the ST2 engine to perform a phase measurement and a strobe to cause the ST2 engine to store the thirty-two bit frequency data for the numerically controlled oscillator.

Also provided is a data/address bus 466 that permits the Z180 microprocessor 440 to transmit and receive data from the various blocks, In particular, the ST2 engine 406 provides the phase difference data to the microprocessor 440 for performing the various matrix control operations to provide the Universal Disciplined Time. To take the phase measurements, phase measurements are taken every 100 milliseconds by using a 20 millisecond timer of the processor 440.

The memory for the system is as follows:

| Size | Description |
| --- | --- |
| 128K Bytes | Downloadable Program Memory (Flash or EEPROM) |
| 128K Bytes | Data Memory (RAM) |

The microprocessor uses both external memory for the program and data and uses memory mapped input/output. Preferably, the microprocessor 440 writes a thirty two bit word to the ST2 engine 406 for setting the frequency of the ST2 output while receiving phase difference measurements from the various clock sources (4 KHz RbA and RbB, GPS, Loran etc.) for use by the microprocessor 440 to derive the universal disciplined time. The measured phase difference from the ST2 engine for each of the phase measurements is also stored in the RAM. In particular, as noted above, the ST2 engine 406 provides the various phase measurements of table I so that the microprocessor can determine the thirty two bit frequency Value provided to the ST2 engine 406. The microprocessor performs all of the manipulation for table II above and optionally table III to derive an estimate of the universal time, This estimate is then used for creating the thirty-two bit word used to control the ST2 to be in frequency and phase lock according to the calculations given above for equations 1 through 5.

The memory map is also used for controlling the selector 402, the real time clock 448, the time of day engine 422, the I/O Interrupt/Status registers in I/O interrupt controller 452, the interrupt mask register 463, and the two control registers, control register A and control register B, also contained in the I/O interrupt controller 460. In addition, the strobe, start and strobe lines for starting the determining of and the reading of the measured phase error between the various inputs tO the ST2 engine 406 and the watch dog reset and clearing of the 1PPS 424 interrupt are also controlled by memory accesses.

The Status/Interrupt Register in the I/O interrupt controller can be divided into two bytes with allocation of the bits in the most significant byte being as follows:

| Bit | Name | Description |
| --- | --- | --- |
| 7 | Reserved | |
| 6 | Stratum Done | Indicates ST2 engine 402 is Finished Measuring Phase Difference |
| 5 | Reserved | |
| 4 | GTR Length Meas. Done | 0 = Normal |
| 3 | Scroll Display Pushbutton | 0 = Normal, 1 = Depressed |
| 2 | Stratum Lock | Indicates ST2 is in Lock |
| 1 | Primary (RbA) PLL Lock | Indicates RbA is valid |
| 0 | Reference (RbB) PLL Lock | Indicates RbB is valid |

The Status/Interrupt Register organization for the Least Significant Byte of the interrupt register is as follows:

| Bit | Name | Description |
| --- | --- | --- |
| 7 | N/A | |
| 6 | N/A | |
| 5 | GTR No Voltage | 0 = normal, 1 = no voltage |
| 4 | GTR No Current | 0 = normal, 1 = no current |
| 3 | Output Monitor | 0 = normal, 1 = fail |
| 2 | GPS 4KHz Monitor | 0 = normal, 1 = fail |
| 1 | RbB Monitor | 1 = normal, 0 = fail |
| 0 | RbA Monitor | 1 = normal, 0 = fail |

The mask register provides addressable masks so that interrupts can be deactivated by the microprocessor and the mask bit mapping for the mask register is the same. The masked output is coupled to Interrupt number 1.

The Hardware Control Register A Most Significant Byte is as follows

| Bit | Name | Description |
| --- | --- | --- |
| 7 | Fail LED | |
| 6 | Status LED | 10 = green, 01 = red, 00 = off, 11 = off |
| 5 | | |
| 4 | Output LED | 10 = green, 01 = red, 00 = off, 11 = off |
| 3 | | |
| 2 | Activity LED | 0 = off, 1 = off |
| 1 | Reserved | |
| 0 | Reserved | |

The Hardware Control Register A least significant byte is as follows.

| Bit | Name | Description |
| --- | --- | --- |
| 7 | Major Alarm | 0 = normal, 1 = alarm |
| 6 | Minor Alarm | 0 = normal, 1 = alarm |
| 5 | Status Alarm | 0 = normal, 1 = alarm |
| 4 | ACO | 0 = off, 1 = on |
| 3 | ACO Clear | 0 = off, 1 = on |
| 2 | Reserved | |
| 1 | Reserved | |
| 0 | Reserved | |

The Hardware Control Register B is as follows:

| Bit | Name | Description |
| --- | --- | --- |
| 7 | MIS RTS | 1 = request to send |
| 6 | MIS TX Enable | 1 = enabled |
| 5 | Output Enable | 1 = enable, 0 = disable for the LIU's. |
| 4 | GTR Power On | 1 = on, 0 = off |
| 3 | Sync Serial Port Enable | 1 = enable, 0 = disable |
| 2 | Sync Serial Port Select | 1 = framer, 0 = other |
| 1 | Reference Select Mux Bit 1 | Select Input for 20.128 MHz PLL |
| 0 | Reference Select Mux Bit 0 | |

Thus, FIGS. 6 and 7 show an embodiment of a clock distribution system providing a universal disciplined time scale as a local primary reference source for an office or the like.

Although the specific embodiment was described being done with digital technology, it would be readily understood that the various embodiments could be implemented, in whole or in part, using, for example, voltage controlled oscillators in lieu of NCO's and phase detectors in lieu of time measuring devices. In addition, various other components may be modified as will be readily understood by those of ordinary skill in the field. Also, although the specific embodiments are more particularly directed to telecommunications, the embodiments may be used in local and wide area computer networks and electrical power distribution networks. The scope of the invention is, of course, defined by the claims.

I claim:

1. A method of attaining syntonisation between a local clock and a universal time source, wherein the universal time is transmitted via a signal over a medium that is subject to adding linear and non-linear noise effects to the signal, the method comprising:

providing a plurality of constituent time clocks, each time clock providing a clock signal at the output;

ensembling the outputs of the time clocks to provide ensembled time clock information, wherein the ensembled time clock information is more stable than any of the constituent time clocks;

receiving the universal time clock signal repeatedly determining the difference in frequency between the universal disciplining clock signal and the ensembled time clock information; and generating from a plurality of said frequency differences and at least one of the constituent time clocks and the ensembled time, a clock signal at the same frequency as the universal time clock signal.

2. The method of claim 1, wherein the method further comprises providing a receiver adapted to receive a global positioning satellite timing signal to provide the universal time clock signal.

3. The method of claim 1, wherein the method further comprises providing a receiver adapted to receive a Loran timing signal to provide the universal time clock signal.

4. The method of claim 1, wherein the method further comprises:

providing a time measuring device having two inputs to provide information representative of the phase difference between the two input signals repetitively selecting different constituent clocks as a first input to the time measuring device and providing the information representative of the phase difference between the output clock signal and the selected one of the constituent clock signals; and producing a data matrix based upon the information from the representative phase differences for use in ensembling the clock signals.

5. The method of claim 4, wherein the matrix comprises a pairwise matrix.

6. The method of claim 4, wherein the matrix comprises an incremental pairwise matrix.

7. A time scale generator having:

a plurality of local clocks, each local clock producing timing information, the timing information having a level of reliability and stability;

an ensembler responsive to the plurality of local clocks to produce time scale information, the time scale information having a level of reliability and stability greater than the levels of stability and reliability of the timing information of each of the local clocks;

a receiver adapted to receive from a communications channel that is subject to adding linear and non-linear noise to a universal disciplining signal having timing information therein;

a universal disciplining clock signal generator producing universal disciplining clock information having timing parameter information in response to the received signal; and a means for disciplining the ensembled time base information to the timing parameter information of the universal disciplining clock information to provide a disciplined output signal.

8. The time scale generator of claim 7, wherein the universal time clock information is a universal time clock signal and the ensembled time information is an ensembled clock signal and the generator further comprises:

a time measuring device to provide information related to at least one of the frequency and the phase difference between the ensembled time clock signal and the universal disciplining clock signal;

a controllable oscillator responsive to the ensembled time clock signal and control information to produce a clock signal based upon the ensembled time clock signal and the control information; and a controller responsive to the output of the time measuring device to produce the control information for the controllable oscillator such that the output of the oscillator is frequency disciplined.

9. The time scale generator of claim 8, wherein the controller averages the information from the time measuring device over a lengthy period of time.

10. The time scale generator of claim 7, wherein the generator includes a processor that performs the programmatic steps of:

producing pairwise data for each local clock and the universal disciplining clock signal;

producing data representative of the ensemble state based upon the pairwise data for each local clock;

determining the difference between the ensemble state and the universal time clock signal at various points in time to obtain an average difference; and outputting a clock signal based upon the difference between the ensemble state and having the long-term frequency of the universal clock signal based upon the average difference.

11. The time scale generator of claim 10, wherein the pairwise data is incremental pairwise data.

12. A telecommunication network having a plurality of switching offices having a plurality of local clocks having a frequency with a stability and reliability, wherein the telecommunications network exists in an area that receives a signal over a medium that is subject to adding errors to the signal containing universal disciplining clock timing information having a frequency, wherein the improvement comprises at a plurality of at least some of the switching offices:

a means for ensembling the plurality of local clocks for that office to provide ensembled time base information having a frequency and the ensembled time base information having a reliability and stability greater than each of local clocks for the office;

a means for determining repeatedly the frequency difference between the ensembled time base information and the universal time base clock information; and a means for providing a local time base signal for use by the local office having a frequency based upon the average frequency difference between the ensembled time and the universal time clock information, whereby the local time base signals at said each of the plurality of switching offices are in syntonisation with each other.

13. The telecommunication network of claim 12, wherein each of the local time base signals is a four kilohertz clock signal.

14. The telecommunications network of claim 12, wherein each of said plurality of switching offices has a receiver coupled to provide the universal time scale information to the determining means.

15. The telecommunications network of claim 12, wherein the means for determining at least a plurality of comprises a stop/start counter.

16. The telecommunications network of claim 12, wherein the means for determining at least some of the plurality of comprises a phase detector producing a signal dependent upon the frequency difference.

17. The telecommunications network of claim 12, wherein the signal containing the universal time clock information is a GPS signal and each of said plurality of has a GPS receiver providing the universal time clock information to the determining means.

18. The telecommunications network of claim 12, wherein a clock source from a first is also used by the means for ensembling to provide the ensembled time base information.

19. A method of providing in a network comprised of a plurality of nodes transmitting units of information between each other, wherein the network being located in an area where a signal including universal time clock information is receivable through a medium that is subject to adding errors to the universal time clock information, syntonisation between a plurality of the nodes, the method comprising:

generating local clock information at each of the plurality of nodes;

receiving the universal time clock information at each of the plurality of nodes;

determining at each of the plurality of nodes from time to time the frequency difference between the local clock information and the universal time clock information;

generating based upon a plurality of the determinations said syntonised clock signal at each of the plurality of nodes having the same frequency.

20. The method of claim 19, wherein the network comprises a telephone network.

21. The method of claim 19, wherein the network comprises a data local area network.

22. The method of claim 19, wherein a plurality of the nodes in the network comprises a telephone switching office.

23. The method of claim 19, wherein the local clock information comprises a plurality of local clocks at each node in the network.

24. The method of claim 23, wherein the method comprises:

determining at each of the plurality of nodes the frequency difference between at least some of the local clocks repeatedly;

producing based upon the frequency differences of the local clocks ensemble time information for each of the plurality of nodes;

generating repeatedly second frequency difference information between the ensemble time information for each of the plurality of nodes and the universal clock information;

generating based upon the second frequency difference information at each of the nodes a clock signal syntonised to a clock signal at each of the other plurality of nodes.

25. The method of claim 24, wherein the ensemble time information for at least some of the plurality of nodes is based in part upon a local clock located at another node.

26. A method for disciplining an ensembled group of clock signals to a universal time source signal provided over a channel having both linear and nonlinear noise effects, the method comprising:

using a time scale algorithm on information relating to the group of clocks and the universal time source signal to provide state estimates of the difference between an ensemble time and each of the group of clocks and to provide an ensemble time state with no weight being given to the universal time source signal in the ensemble time state;

disciplining the ensemble time state to the universal time source signal through a low pass filtering algorithm to provide a disciplined time state; end generating a clock signal based upon the disciplined time state.

27. An apparatus for disciplining a collection of clock sources to a universal time scale received over a noisy channel, the apparatus comprising:

a controllable oscillator providing as an output a clock signal disciplined to the universal time scale; and a processor responsive to each of the clock sources and the universal time scale to provide an ensemble time scale giving the universal time scale zero weight and using the difference between the ensemble time scale and the universal time scale to control the oscillator.

* * * * *

UNITED STATES PATENT AND TRADEMARK OFFICE
CERTIFICATE OF CORRECTION

PATENT NO. : 5,666,330  
DATED : September 9, 1997  
INVENTOR(S) : George Phillip Zampetti Page 1 of 1

It is certified that error appears in the above-identified patent and that said Letters Patent is hereby corrected as shown below:

Column 7,  
Line 61, replace "compensating" with -- compensate --.

Column 8,  
Line 34, replace "a" with -- as --.  
Line 46, insert -- dominates -- between "source" and ",".  
Line 47, replace "aominates" with -- dominates --.

Column 11,  
Line 58, insert -- . -- after "frequency" and replace "in" with -- In --.

Column 14,  
Line 13, replace "tO" with -- to --.

Column 17, claim 15,  
Line 45, insert -- offices -- before "comprises".

Column 17, claim 16,  
Line 48, insert -- offices -- betweeen "of" and "comprises".

Column 17, claim 17,  
Line 52, insert -- offices -- between "of" and "has".

Column 17, claim 18,  
Line 56, insert -- office -- between "first" and "is".

Signed and Sealed this

Second Day of April, 2002

*Attest:*

JAMES E. ROGAN  
*Director of the United States Patent and Trademark Office*

*Attesting Officer*